United States Patent
Taniguchi et al.

(10) Patent No.: US 9,609,294 B2
(45) Date of Patent: Mar. 28, 2017

(54) ILLUMINATION DEVICE, PROJECTION TYPE IMAGE DISPLAY DEVICE, AND OPTICAL DEVICE

(71) Applicant: DAI NIPPON PRINTING CO., LTD., Tokyo (JP)

(72) Inventors: Yukio Taniguchi, Tokyo (JP); Makio Kurashige, Tokyo (JP); Yasuyuki Ooyagi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/626,778

(22) Filed: Feb. 19, 2015

(65) Prior Publication Data
US 2015/0163467 A1  Jun. 11, 2015

Related U.S. Application Data

(62) Division of application No. 14/115,727, filed as application No. PCT/JP2012/060874 on Apr. 23, 2012, now Pat. No. 8,992,029.

(30) Foreign Application Priority Data

May 10, 2011 (JP) ................................. 2011-105456

(51) Int. Cl.
*G03B 21/28* (2006.01)
*G02B 5/02* (2006.01)
(Continued)

(52) U.S. Cl.
CPC .......... *H04N 9/3129* (2013.01); *F21V 5/008* (2013.01); *F21V 9/14* (2013.01); *G02B 27/48* (2013.01);
(Continued)

(58) Field of Classification Search
CPC ...... H04N 3/08; G03B 21/20; G03B 21/2033; G03B 21/2066; G02B 5/0278; G02B 3/0056; G02B 5/0125
(Continued)

(56) References Cited

U.S. PATENT DOCUMENTS 5,684,566 A  11/1997  Stanton
5,923,475 A   7/1999  Kurtz et al.
(Continued)

FOREIGN PATENT DOCUMENTS

CN   101276062 A   10/2008
CN   101755300 A    6/2010
(Continued)

OTHER PUBLICATIONS

International Search Report for International Application No. PCT/JP2012/060874 dated Jun. 12, 2012.
(Continued)

*Primary Examiner* — William C Dowling
*Assistant Examiner* — Ryan Howard
(74) *Attorney, Agent, or Firm* — Kratz, Quintos & Hanson, LLP

(57) ABSTRACT

To provide an illumination device and a projection type image display device that illuminate an area to be illuminated (image formation area) under conditions where speckle noise is less noticeable.

An illumination device according to the present invention includes: a light source 11 that emits coherent light; an optical scanning section 15 that scans the coherent light emitted from the light source 11; a lens array 22 including a plurality of element lenses and configured to diverge the light scanned by the optical scanning section; an optical path conversion system 23 configured to control a diverging angle of the diverging light to be emitted from respective (Continued)

points of the lens array 22 and to allow the diverging light whose diverging angle has been controlled to illuminate an area to be illuminated sequentially in an overlapping manner.

12 Claims, 8 Drawing Sheets

(51) Int. Cl.
| | |
|---|---|
| G02B 13/20 | (2006.01) |
| H04N 9/31 | (2006.01) |
| G02B 27/48 | (2006.01) |
| G03B 21/20 | (2006.01) |
| F21V 5/00 | (2015.01) |
| F21V 9/14 | (2006.01) |
| G03B 21/14 | (2006.01) |
| G02B 3/00 | (2006.01) |
| G02B 26/10 | (2006.01) |
| G02B 26/12 | (2006.01) |

(52) U.S. Cl.
CPC .......... *G03B 21/14* (2013.01); *G03B 21/208* (2013.01); *G03B 21/2033* (2013.01); *G03B 21/2066* (2013.01); *H04N 9/3135* (2013.01); *H04N 9/3161* (2013.01); *G02B 3/0062* (2013.01); *G02B 3/0087* (2013.01); *G02B 26/105* (2013.01); *G02B 26/12* (2013.01)

(58) Field of Classification Search
USPC .............. 353/38, 98, 94; 359/599, 619, 904; 348/203
See application file for complete search history.

(56) References Cited

U.S. PATENT DOCUMENTS

| | | | |
|---|---|---|---|
| 6,577,429 B1 | 6/2003 | Kurtz et al. | |
| 2002/0114081 A1 | 8/2002 | Ogura | |
| 2003/0179426 A1* | 9/2003 | Ide | G02B 26/0816 359/207.7 |
| 2007/0046921 A1 | 3/2007 | Takahashi | |
| 2007/0153350 A1 | 7/2007 | Yun | |
| 2008/0062501 A1 | 3/2008 | Tajiri | |
| 2008/0247022 A1 | 10/2008 | Yamauchi | |
| 2008/0284920 A1 | 11/2008 | Facius et al. | |
| 2009/0021801 A1 | 1/2009 | Ishihara | |
| 2009/0168424 A1 | 7/2009 | Yamauchi et al. | |
| 2010/0020291 A1 | 1/2010 | Kasazumi et al. | |
| 2010/0110524 A1 | 5/2010 | Gollier | |
| 2010/0232005 A1 | 9/2010 | Lescure et al. | |
| 2010/0315565 A1 | 12/2010 | Bloom et al. | |

FOREIGN PATENT DOCUMENTS

| | | |
|---|---|---|
| DE | 11 2005 001847 B4 | 5/2011 |
| EP | 0 294 122 A1 | 12/1988 |
| JP | S61-212816 | 9/1986 |
| JP | H6-208089 | 7/1994 |
| JP | H9-6011 | 1/1997 |
| JP | 2004-191839 A1 | 7/2004 |
| JP | 2008-204570 A1 | 9/2008 |
| JP | 2008-256824 A1 | 10/2008 |
| WO | 98-52359 A1 | 11/1998 |
| WO | 2006-013814 A1 | 2/2006 |

OTHER PUBLICATIONS

Partial Supplementary European Search Report dated Nov. 17, 2014 in the corresponding European patent application No. 12782132.0-1562.
Office Action mailed Jun. 23, 2014 from the Chinese Patent Office in couterpart application No. 201280022332.9..
Extended European Search Report. Application No. EP12782132. Date of completion of the search was Mar. 3, 2015.
International Search Report. Application No. PCT/GB 98/01396. Date of completion of the search was Aug. 17, 1998.
International Search Report. Application No. PCT/JP2005/014025. Date of completion of the search was Oct. 5, 2005.

* cited by examiner

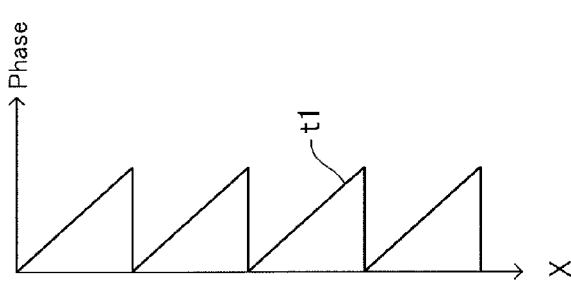
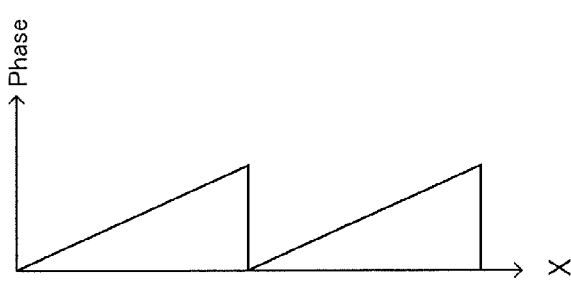
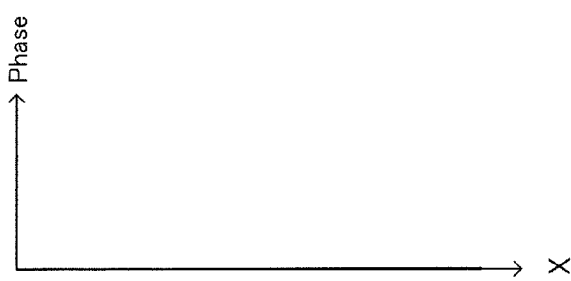
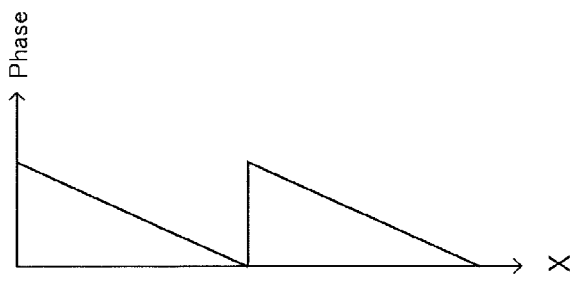
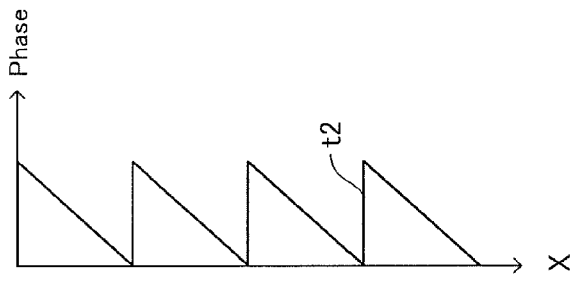

ILLUMINATION DEVICE, PROJECTION TYPE IMAGE DISPLAY DEVICE, AND OPTICAL DEVICE

CROSS-REFERENCE TO RELATED APPLICATIONS

This application is a Divisional Application of prior application Ser. No. 14/115,727 filed on Nov. 5, 2013, which is a §371 national stage application of PCT/JP2012/060874, filed on Apr. 23, 2012, which is based upon and claims the benefit of priority of the prior Japanese Patent Application No. 2011-105456 filed on May 10, 2011, the entire contents of each of the above being incorporated herein by this reference.

TECHNICAL FIELD

The present invention relates to an illumination device that uses coherent light such as laser light, a projection type image display device that uses the coherent light to illuminate an optical modulation element to project an image on a screen, and an optical device for use in the illumination device and projection type image display device.

BACKGROUND ART

There is known a projector (projection type image display device) that uses an optical modulation element (micro display) such as a liquid crystal or MEMS to visualize illumination light from a light source and projects an image based on the illumination light on a screen. Some of such projectors use, as its light source, a white light source such as a high-pressure mercury lamp and projects an image on a screen while magnifying an image obtained by illuminating a two-dimensional optical modulation element such as a liquid crystal.

However, a high-intensity discharge lamp such as the high-pressure mercury lamp has a comparatively short life, so that when the high-intensity discharge lamp is used for a projector, the lamp needs to be replaced frequently with new one. Moreover, the use of the high-intensity discharge lamp disadvantageously increases a size of the projector. Moreover, it is unfavorable to use the high-pressure mercury lamp that uses mercury, in terms of environmental burden. To solve such drawbacks, a projector that uses laser light as its light source is proposed. A semiconductor laser has a longer life than the high-pressure mercury lamp and allows size reduction of the entire projector.

The laser light thus expected to be used as a next-generation light source for projector is excellent in linearity, so that it is considered that incidence rate can be enhanced more than an LED. However, in a case where the laser light is used as the light source, speckle noise may generate due to high coherence, disadvantageously making an image difficult to see.

The speckle noise is granular noise generated due to interference of scattering light from a minute irregularity of a surface to be irradiated when coherent laser light is used as a light source. The speckle noise generated in the projector not only causes degradation of image quality but also provides physiologic discomfort to a viewer. To reduce the speckle noise, various attempts, such as to vibrate a diffuser plate through which the laser light passes, to widen a wavelength spectrum of laser, and vibrate a screen itself which is an irradiation target of the laser light are made. As one of such attempts for speckle noise reduction, Patent Document 1 discloses a non-speckle display device that reduces the speckle noise by rotating a diffuser plate through which coherent light passes.

PRIOR ART DOCUMENT

Patent Document

Patent Document 1: JP 06-208089A

SUMMARY OF THE INVENTION

Problem(s) to be Solved

The speckle noise reduction method disclosed in Patent Document 1 can average speckle noise (interference pattern) generated before arrival at a diffusion element. However, since an angle of incident light from a diffusion center to the screen is invariant at any point on the screen, so that light scattering characteristics at respective points on the screen are constant, with the result that removal effect of the speckle noise generated on the screen can hardly be obtained.

Such speckle caused by the coherent light has become a problem not only in a projection type image display device (projector) that uses the coherent light as a light source, but also in various illumination devices that use the coherent light.

An object of the present invention is to provide an illumination device capable of suppressing speckle generated due to use of the coherent light as a light source and a projection type image display device using the illumination device. Another object of the present invention is to provide the illumination device and projection type image display device capable of effectively illuminating an area to be illuminated to enhance light utilization efficiency. A still another object of the present invention is to illuminate the entire area to be illuminated uniformly by illuminating the area to be illuminated under nearly the same conditions.

Means for Solving the Problem(s)

An illumination device according to the present invention includes: a light source that emits coherent light; an optical scanning section that scans the coherent light emitted from the light source; a lens array including a plurality of element lenses and configured to diverge the light scanned by the optical scanning section; an optical path conversion system configured to control a diverging angle of the diverging light to be emitted from respective points of the lens array and to allow the diverging light whose diverging angle has been controlled to illuminate an area to be illuminated sequentially in an overlapping manner.

In the illumination device according to the present invention, the optical path conversion system illuminates the entire area to be illuminated regardless of a position at which the optical scanning section scans the coherent light.

In the illumination device according to the present invention, the optical path conversion system includes an optical element having a light collection function.

In the illumination device according to the present invention, the element lenses constituting the lens array are each a gradient index lens.

In the illumination device according to the present invention, the element lenses constituting the lens array are arranged in multiple rows in an optical axis direction thereof.

In the illumination device according to the present invention, a beam width of the coherent light that enters the lens array is smaller than an interval between adjacent element lenses.

In the illumination device according to the present invention, a polarization control element is provided at an incident side or an emitting side of the lens array so as to prevent interference between beams passing through the adjacent element lenses.

In the illumination device according to the present invention, an optical element that provides a difference in optical path length so as to prevent interference between beams passing through the adjacent element lenses is provided at the incident side or emitting side of the lens array.

In the illumination device according to the present invention, the optical scanning section includes a galvano mirror.

In the illumination device according to the present invention, the optical scanning section includes a polygon mirror.

In the illumination device according to the present invention, the optical scanning section includes a variable diffraction element.

In the illumination device according to the present invention, the optical scanning section includes a phase modulation element.

In the illumination device according to the present invention, a beam forming means is disposed between the light source and the optical scanning section.

A projection type image display device according to the present invention includes: a light source that emits coherent light; an optical scanning section that scans the coherent light emitted from the light source; a lens array including a plurality of element lenses and configured to diverge the light scanned by the optical scanning section; an optical modulation element having an image formation area in which an image is formed; an optical path conversion system configured to control a diverging angle of the diverging light to be emitted from respective points of the lens array and to allow the diverging light whose diverging angle has been controlled to illuminate an area to be illuminated sequentially in an overlapping manner; and a projection optical system that projects the image of the optical modulation element on a screen.

In the projection type image display device according to the present invention, the optical path conversion system is an imaging optical device that keeps focal planes of the element lenses of the lens array and a pupil surface of the projection optical system in a substantially conjugate relationship.

An optical device according to the present invention includes: an optical scanning section that scans coherent light; a lens array including a plurality of element lenses and configured to diverge the light scanned by the optical scanning section; and an optical path conversion system configured to control a diverging angle of the diverging light to be emitted from respective points of the lens array and to allow the diverging light whose diverging angle has been controlled to illuminate an area to be illuminated sequentially in an overlapping manner.

Advantages of the Invention

According to the illumination device of the present invention, the optical scanning section scans the coherent light to cause the illumination light to be emitted from the lens array to illuminate the area to be illuminated at an angle changing with time. This allows the speckle generated in the area to be illuminated to be made invisible to a viewer. Moreover, in the projection type image display device according to the present invention, the screen is also subjected to irradiation at an angle changing with time, thereby effectively suppressing the speckle to be generated on the screen.

Moreover, in the illumination device (projection type image display device) according to the present invention, it is possible to illuminate the area to be illuminated (image formation area) with the diverging light which is emitted from the lens array and whose diverging angle has been controlled. This allows respective sections of the area to be illuminated (image formation area) to be illuminated under substantially the same conditions, which, for example, allows the entire area to be illuminated (image formation area) to be illuminated uniformly.

BRIEF DESCRIPTION OF THE DRAWINGS

FIGS. 8A to 8E are views each illustrating the phase change in the optical scanning section (phase modulation element) according to another embodiment of the present invention.

MODE FOR CARRYING OUT THE INVENTION

Figure 1:
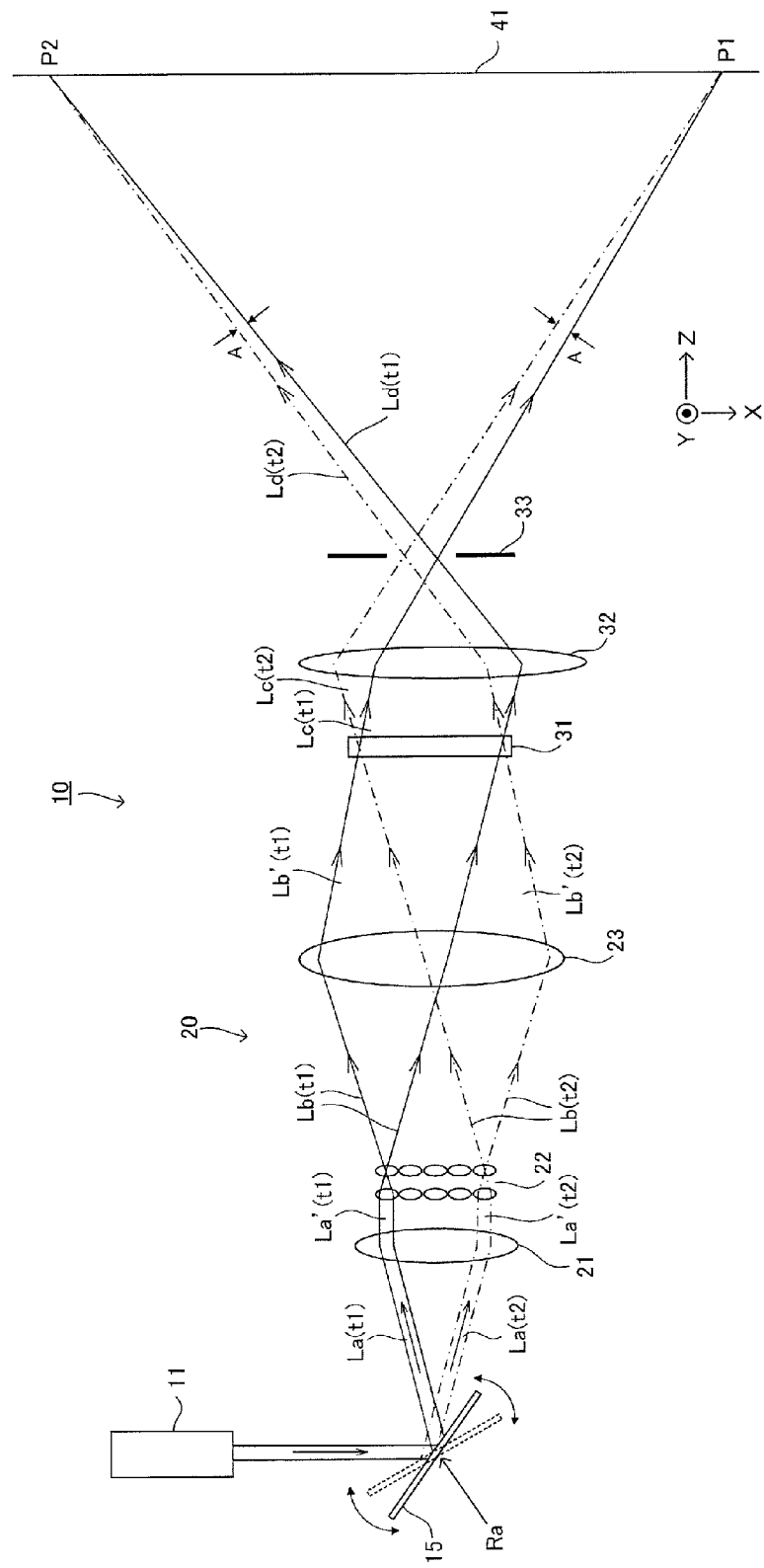
FIG. 1 is a view illustrating a configuration of a projection type image display device provided with an illumination device according to an embodiment of the present invention.

Now, an illumination device and a projection type image display device according to an embodiment of the present invention will be described with reference to the drawings. FIG. 1 is a view illustrating a configuration of a projection type image display device provided with an illumination device according to an embodiment of the present invention. It should be noted that drawings described hereinafter are each a schematic diagram, and may represent different shape, dimension, and position from those actually illustrated.

A projection type image display device 10 according to the present embodiment includes an illumination device 20, an optical modulation element 31 for forming an image, and a projection optical system 32 that projects an image formed by the optical modulation element 31 on a screen 41. In the drawings, a surface of the screen 41 on which an image is projected is assumed to be X-Y plane, and an axis normal to the X-Y plane is assumed to be a Z-axis. As the screen 41, a reflective screen for observing an image reflected by the screen 41 or a transmissive screen for observing an image transmitted through the screen 41 can be used.

The illumination device 20 of the present embodiment includes a light source 11, an optical scanning section 15, a first optical path conversion system 21, a lens array 22, a second optical path conversion system 23. The optical device of the present embodiment is constituted by the constituent elements of the illumination device other than the light source 11. It should be noted that the first optical path conversion system 21 is not essential.

As the light source 11, various types of laser systems, including a semiconductor laser system, that emit laser light as coherent light can be used. The coherent light emitted from the light source 11 illuminates the optical scanning section 15. It is preferable to provide a beam forming means for uniforming an intensity distribution of the coherent light emitted from the light source 11 in a cross-sectional direction thereof. For example, the beam forming means is provided so as to achieve the uniformization on a surface in the vicinity of the optical scanning section, and the optical path conversion system 21 is set such that the surface and optical modulation element surface are in a conjugate relationship, thereby allowing illumination of the area to be illuminated with a uniform intensity.

The optical scanning section 15 is an optical element that changes with time a direction of the coherent light emitted from the light source 11. In the present embodiment, a galvano mirror that can rotate a reflecting surface about a rotation center Ra is used. As such a movable mirror device that mechanically rotates a movable mirror, a polygon mirror, or an MEMS scanner can also be used. In addition, there can be used a variable diffraction element that electrically changes a diffraction condition to change a light emitting direction or a phase modulation element. Unlike the movable mirror device, such elements do not include a movable portion, so that it is possible to reduce process burden at manufacturing time or maintenance time. Details of this will be described later.

The optical scanning section 15 of the present embodiment has a rotation center Ra in a Y-axis direction and performs one-dimensional scanning that scans the coherent light in an X-Z plane. However, the optical scanning section 15 may perform one-dimensional scanning or two-dimensional scanning for the coherent light. In each case, it is necessary for the optical scanning section 15 to scan an incident surface of the optical path conversion system 21 so as to consequently sufficiently illuminate the area to be illuminated.

The coherent light emitted from the light source 11 enters the optical scanning section 15. In the optical scanning section 15, the coherent light becomes scanning light La whose direction is changed with time and then enters the lens array 22 through the first optical path conversion system 21. In the drawing, scanning light La (t1) and scanning light La (t2) around the outermost ends are illustrated. Actually, however, the scanning light La moves between the La (t1) and La (t2) in a continuous manner.

The first optical path conversion system 21 is an optical element that converts the scanning light La from the optical scanning section 15 into scanning light La' that enters substantially vertically an incident surface of the lens array 22 and is constructed using a convex lens having a light collection function. Making the converted scanning light La' enter vertically respective element lenses constituting the lens array 22 allows the scanning light La' to enter the element lenses under the same conditions. This allows the same design to be applied to all the element lenses of the lens array 22 to reduce design burden. The first optical path conversion system 21 need not always be provided. In a case where the first optical path conversion system 21 is not provided, configurations of the element lens constituting the lens array 22 and an optical system provided on a downward side thereof are changed depending on a state of incident light.

The lens array 22 is an optical element having a configuration in which a plurality of element lenses are arranged at a position (on an X-Y plane) scanned by the scanning light La' from the optical scanning section 15. The lens array 22 is configured to convert the scanning light La' entering the element lenses into diverging light Lb. A size and a shape of each element lens constituting the lens array 22 can be changed according to need. For example, a cylindrical lens array constituted by element lenses each having a cylindrical shape or a micro lens array constituted by element lenses each having an extremely small size may be used. Moreover, in the present embodiment, the element lenses are arranged in multiple rows (two rows) in an optical axis direction (Z-axis direction) thereof. The coherent light emitted from the light source 11 is not always parallel light, but may include a scattering component slightly deviate from a parallel state. In the present embodiment, to suppress the scattering component, the element lenses are arranged in multiple rows in the optical axis direction. The element lenses arranged in the optical axis direction have the same diameter and have central axes parallel to a light travel direction. The lens array 22 may have a configuration in which the element lenses are arranged in one row in the optical axis direction.

The second optical path conversion system 23 ("optical path conversion system" in the present invention) is an optical element that illuminates an image formation area as an area to be illuminated with the diverging light Lb. The diverging light Lb emitted from respective points of the lens array 22 scanned by the optical scanning section 15 passes through the second optical path conversion system 23 and then illuminates the area to be illuminated sequentially in an overlapping manner. Preferably, the second optical path conversion system 23 has a light collection function that allows the diverging light Lb emitted from the lens array 22 to illuminate the image formation area of the optical modulation element 31 as the area to be illuminated. By controlling a diverging angle of the diverging light Lb diverged by the lens array 22 to converge it on the image formation area, it is possible to enhance light utilization efficiency. Moreover, preferably, the second optical path conversion system 23 converts the diverging light Lb into parallel or substantially parallel light. Illuminating the image formation area with the parallel or substantially parallel light allows respective sections of the image formation area to be illuminated under substantially the same conditions, which, for example, allows the entire image formation area to be illuminated uniformly.

The second optical path conversion system 23 is only required to have the diverging angle control function and is constructed using a combination of a mirror and a prism. Alternatively, a hologram element or a diffraction element having an equivalent function may be used. Further alternatively, a combination of the above elements may be used.

Diverging light Lb' emitted from the second optical path conversion system 23 only needs to illuminate at least a part of the image formation area at each time point and illuminate the entire image formation area along with the scanning performed by the optical scanning section 15. Preferably, however, the diverging light Lb' illuminates the entire image formation area at each time point. This allows a brightness distribution to be made uniform in the image formation area.

The optical modulation element 31 is a display having the image formation area in which an image is formed based on an image signal. In the present embodiment, a transmissive liquid crystal element is used as the optical modulation element 31. In addition to such a transmissive type, a reflective type such as an MEMS can be used. The diverging light Lb' from the second optical path conversion system 23 enters the optical modulation element 31 while changing its incident angle with time and is then converted into modulated light Lc based on an image displayed in the image formation area.

The projection optical system 32 performs magnification conversion for the modulated light Lc to convert it into image reproduction light Ld for projection on the screen 41. In the present embodiment, a diaphragm 33 is provided at a downstream side of the projection optical system 32. Preferably, the diaphragm 33 (pupil surface of the projection optical system) and focal planes of the element lenses of the lens array are kept in substantially a conjugate relationship. With this configuration, imaging optical characteristics of the beams from all the element lenses can be made uniform within a plane of the optical modulation element.

Figure 2:
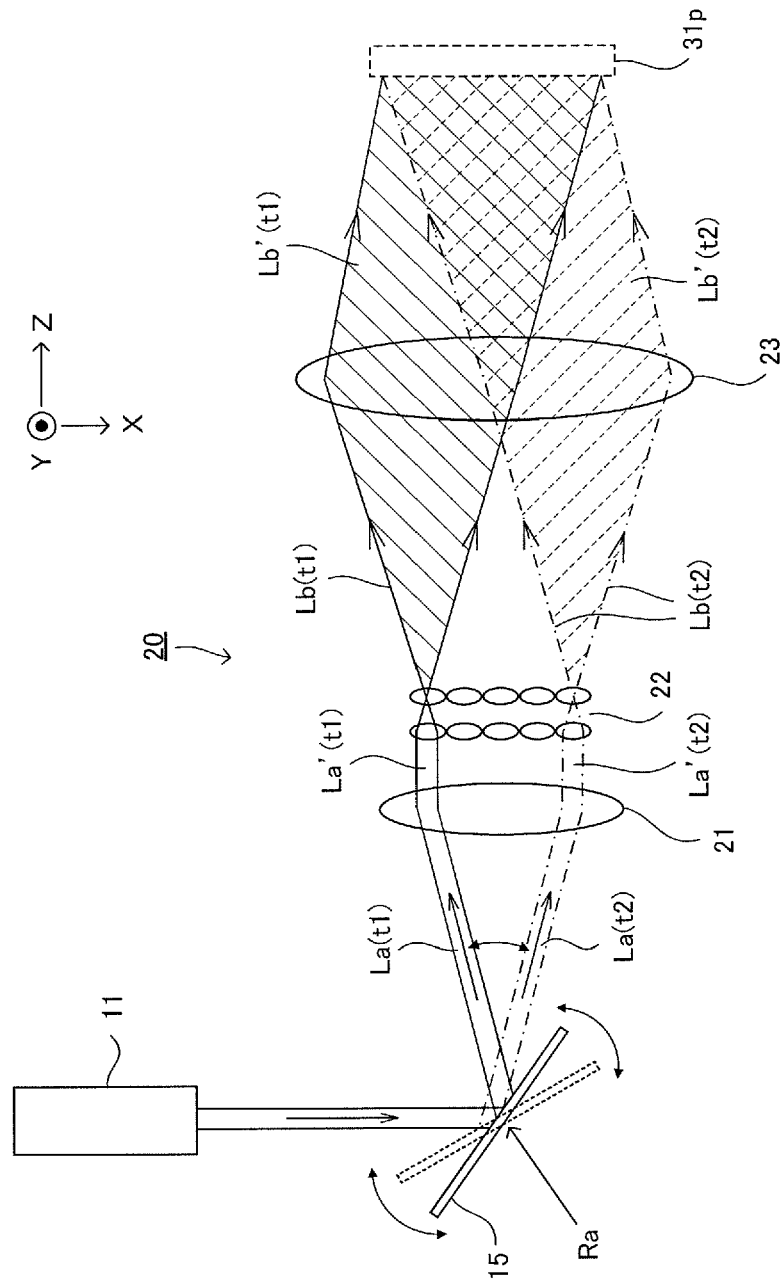
FIG. 2 is a view illustrating a configuration of the illumination device according to the embodiment of the present invention.

Now, an operation principle, etc., of the illumination device 20 functioning as a main factor for suppressing the speckle in the projection type image display device 10 will be described in detail. FIG. 2 is a view illustrating a configuration of the illumination device 20 according to the embodiment of the present invention, which shows a state of illumination by the lens array 22.

As illustrated in FIG. 2, the scanning light La (t1) at time t1 enters the optical path conversion system 21 and is then converted into illumination light La' (t1) that enters vertically the incident surface of the lens array 22 to be emitted therefrom as the diverging light Lb (t1). The diverging light Lb (t1) emitted from the lens array 22 is converted by the second optical path conversion system 23 so as to illuminate at least a part of the image formation area of the optical modulation element 31 to illuminate that area. Similarly, the scanning light La (t2) at time t2 is converted by the second optical path conversion system 23 into the diverging light Lb' (t2) to illuminate at least a part of the image formation area. As illustrated, the illumination device 20 illuminates the area to be illuminated while changing with time the incident angle with respect to the area to be illuminated.

Returning to FIG. 1, the modulated light Lc modulated by the optical modulation element 31 is magnified by the projection optical system 32 and projected on the screen 41 as the image reproduction light Ld, allowing a viewer to observe an image reflected from or transmitted through the screen 41. At this time, the coherent lights projected on a surface of the screen 41 interfere with each other to cause speckle. However, in the present embodiment, the coherent light is scanned by the optical scanning section 15, which consequently sequentially changes an incident angle of the image reproduction light Ld to be projected on the screen 41. This extremely effectively makes the speckle less noticeable.

For example, the image reproduction light Ld (t1) at the time t1 and image reproduction light Ld (t2) enter a point P1 on the screen illustrated in FIG. 1 at different incident angles. The same can be said for a point P2 illustrated in FIG. 1 and other not illustrated points. That is, the image reproduction light Ld projects an image on the screen 41 while changing with time the incident angle. Therefore, in an extremely short time, the speckle formed on the screen is averaged in terms of time within a visual response time by the image reproduction light Ld which is irradiated at an incident angle changing with time and thereby becomes sufficiently less noticeable to the viewer viewing the image projected on the screen 41.

The speckle observed by the viewer includes not only the speckle thus generated due to scattering of the coherent light on the screen 41, but also speckle generated on various optical elements of the projection type image display device 10. Such speckle is observed by the viewer when being projected on the screen 41 through the optical modulation element 31. In the present embodiment, the scanning light La scans the lens array 22 to allow illumination of the image formation area of the optical modulation element 31 as the area to be illuminated. That is, illuminating the area to be illuminated so as to isolate in terms of time the diverging lights from respective points of the lens array 22 from each other allows cancellation of phase information retained until the light passes through the lens array 22 and allows prevention of interference between the diverging lights from respective points of the lens array 22, which can make the speckle generated on the respective optical elements of the projection type image display device 10 sufficiently less noticeable.

As described above, in the present embodiment, the lens array 22 is scanned by the optical scanning section 15 with the scanning light La' with the scanning position changed with time. The lens array 22 is constituted by the plurality of adjacently disposed element lenses, so that the beams may be incident over the adjacent element lens. At this time, outgoing lights from the element lens interfere with each other to disadvantageously generate unevenness or a stripe pattern in the area to be illuminated.

Figure 3:
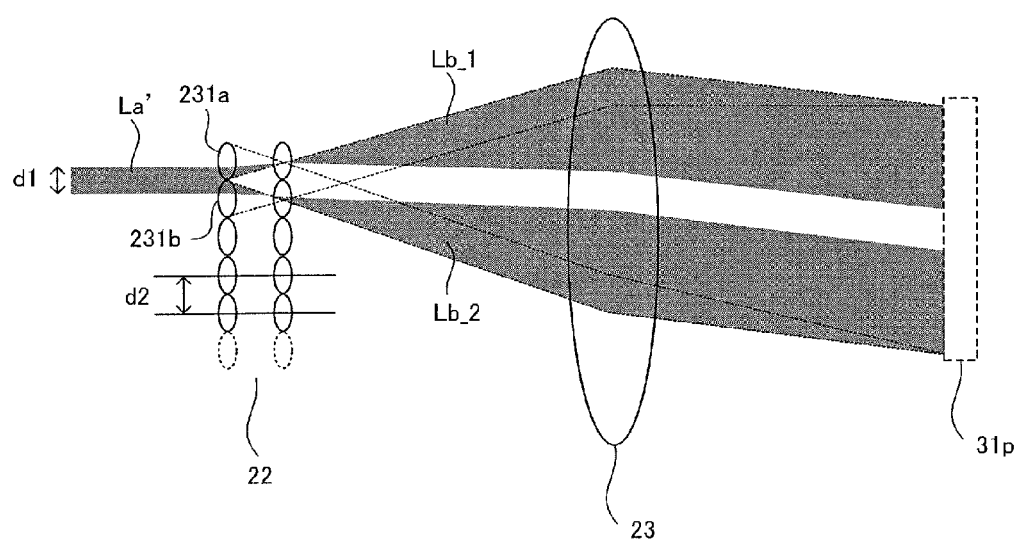
FIG. 3 is a view illustrating a relationship between a lens array according to the present embodiment and coherent light entering the lens array.

Preferably, the following configuration is employed in order to suppress such interference between the outgoing lights from the element lenses. FIG. 3 is a view illustrating a relationship between the lens array 22 according to the present embodiment and scanning light La' entering the lens array 22. FIG. 3 illustrates a state where the beams of the scanning light La' are incident over two element lenses 231*a* and 231*b* constituting the lens array. As illustrated, the scanning light La' is converted into diverging light Lb_1 and diverging light Lb_2 by element lenses 231*a* and 231*b*, respectively, to illuminate the optical modulation element 31. At this time, by setting a beam width d1 of the scanning light La' smaller than an interval d2 between the adjacent element lenses, it is possible to prevent the diverging light Lb_1 and diverging light Lb_1 from being superimposed on each other to thereby suppress the interference therebetween.

Figure 4A:
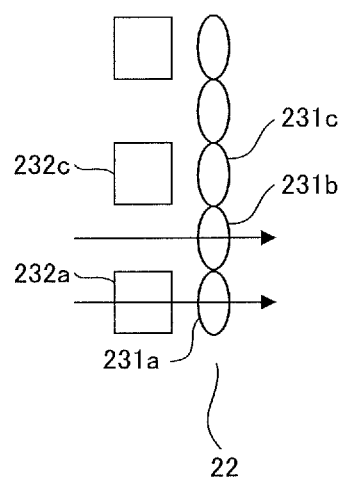
FIGS. 4A and 4B are views each illustrating a configuration for preventing interference between element lenses according to another embodiment of the present invention.
Figure 4B:
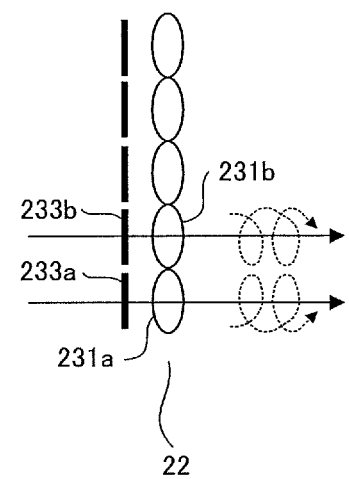

In addition to the method of specifying the relationship between the beam width d1 and element lens interval d2, the following configuration can be employed as a means for preventing the interference between the outgoing lights from the element lenses 231. FIGS. 4A and 4B are views each illustrating a configuration for preventing the interference between the element lenses according to another embodiment of the present invention.

FIG. 4A is an embodiment in which transparent bodies 232 are provided at an upstream side of the element lenses 231 constituting the lens array 22 so as to correspond to every other element lenses 231. The transparent bodies 232 are optical elements for differentiating an optical path length. With this configuration, the optical path length is differentiated between the adjacent element lenses 231, e.g., element lenses 231*a* and 231*b* by not less than a coherent length of the light source, whereby it is possible to prevent the interference between the element lenses 231.

FIG. 4B is an embodiment in which λ/4 wavelength plates 233 are provided at an upstream side of the element lenses 231 constituting the lens array 22. As illustrated, the adjacent λ/4 wavelength plates 233, e.g., λ/4 wavelength plates 233a and 233b are provided so as to have different polarization directions. Moreover, light to be incident on the element lenses 231 is previously set in a linearly polarized state. Also with this configuration, it is possible to prevent the interference between the outgoing lights from the element lenses 231. In this example, the outgoing lights from the element lenses 231 are circularly-polarized lights, which are made different in terms of polarized direction (one of the two adjacent element lenses 231 is clockwise, and the other thereof is counter clockwise) to thereby prevent the interference. Alternatively, the light to be incident on the element lenses 231 is isotopically polarized, and polarization plates having different axial directions are provided at the upstream side of the element lenses 231. Further alternatively, elements other than the above that can prevent the polarization states from interfering with each other may be employed.

The transparent bodies 232 of FIG. 4A and λ/4 wavelength plates 233 of FIG. 4B may be provided at a downstream side of the element lenses 231, in place of being provided at the upstream side thereof. Also in this case, the same effect can be obtained. Moreover, the configuration of the embodiment illustrated in FIG. 3 and configuration of the embodiment illustrated in FIG. 4 may be combined.

Figure 5:
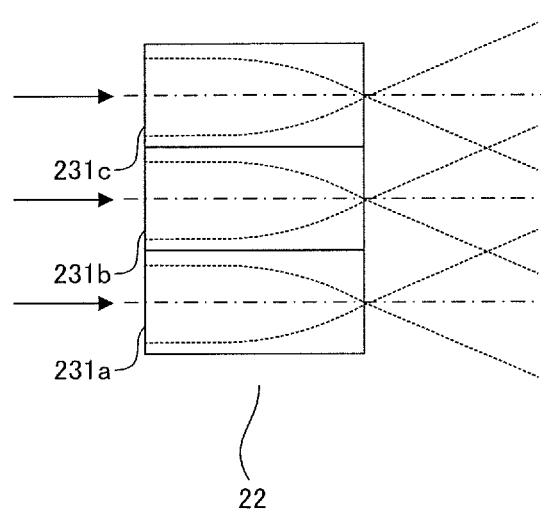
FIG. 5 is a view illustrating a configuration of the lens array using gradient index lenses according to another embodiment of the present invention.

As the element lenses 231 constituting the lens array 22 used in the present embodiment, gradient index lenses may be used. FIG. 5 is a view illustrating a configuration of the lens array using the gradient index lenses. The gradient index lens is a lens whose material is made different section by section to change a refractive index. Particularly, in the configuration like the present embodiment, in which the incident surface is subjected to scanning, design of the element lenses 231 in accordance with various conditions of the incident light, such as incident angle can be facilitated. In FIG. 5, a part of the lens array 22 constituted by the gradient index type element lenses 231 is shown together with an optical axis center and an optical path of each element lens 231.

Figure 6:
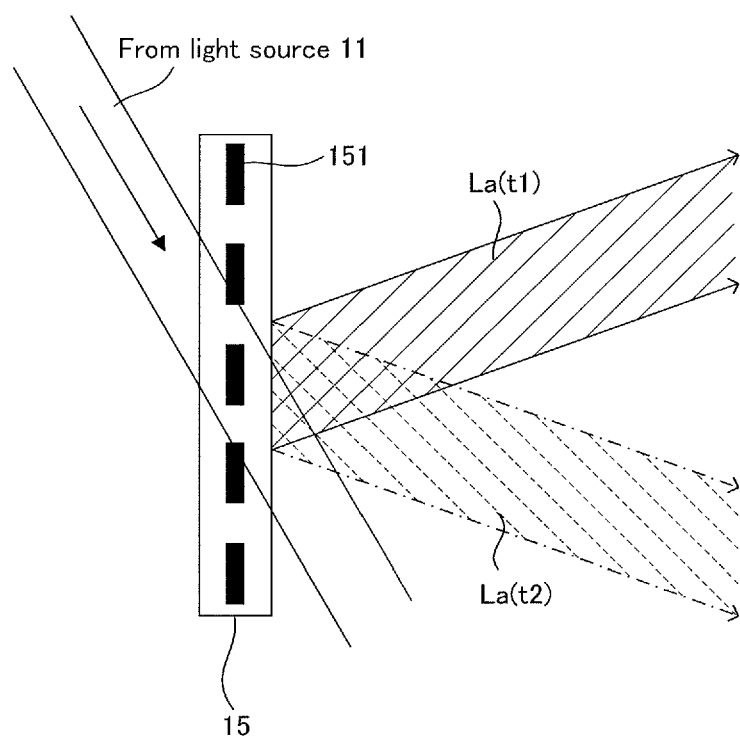
FIG. 6 is a view illustrating a configuration of an optical scanning section (variable diffraction element) according to another embodiment of the present invention.
Figure 7B:
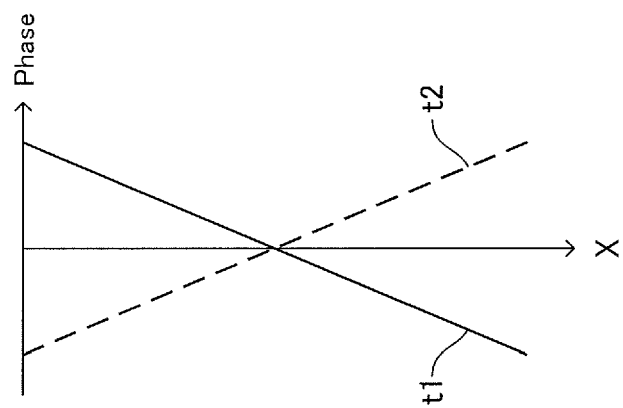
FIGS. 7A and 7B are views illustrating a configuration of the optical scanning section (phase modulation element) and a phase change in the optical scanning section, respectively, according to another embodiment of the present invention.

The optical scanning section 15 constituted by the movable mirror device using the galvano mirror has thus been described with reference to FIG. 1. However, the optical scanning section 15 may be realized using a variable diffraction element or a phase modulation element that does not include a movable portion. FIG. 6 is a view illustrating a configuration of the optical scanning section (variable diffraction element) according to another embodiment of the present invention, FIG. 7A is a view illustrating a configuration of the optical scanning section (phase modulation element) according to another embodiment of the present invention, FIG. 7B is a view illustrating a phase change in the optical scanning section, and FIGS. 8A to 8E are views each illustrating the phase change in the optical scanning section (phase modulation element) according to another embodiment of the present invention.

The optical scanning section 15 of FIG. 6 is an embodiment using the variable diffraction element. In this embodiment, an amplitude modulation type liquid crystal element is used as the variable diffraction element. The liquid crystal element constituting the optical scanning section 15 forms a diffraction grating by liquid crystal 151. A pitch of the diffraction grating formed by the liquid crystal 151 is changed with time to change a diffraction angle, thereby allowing the emission direction of the coherent light emitted from the light source 11 and entering the optical scanning section 15 to be changed with time. In the present embodiment, the coherent light is made to obliquely enter an incident surface of the optical scanning section 15 to allow zero-dimensional light to escape and allow diffracted light to be emitted in a normal direction of the element.

As the variable diffraction element, in addition to the above liquid crystal element, an optical element, such as an acoustic-optical element, that modulates a phase of light passing there through may be used. Alternatively, a micromirror device that modulates a phase of light to be reflected thereby may be used.

Figure 7A:
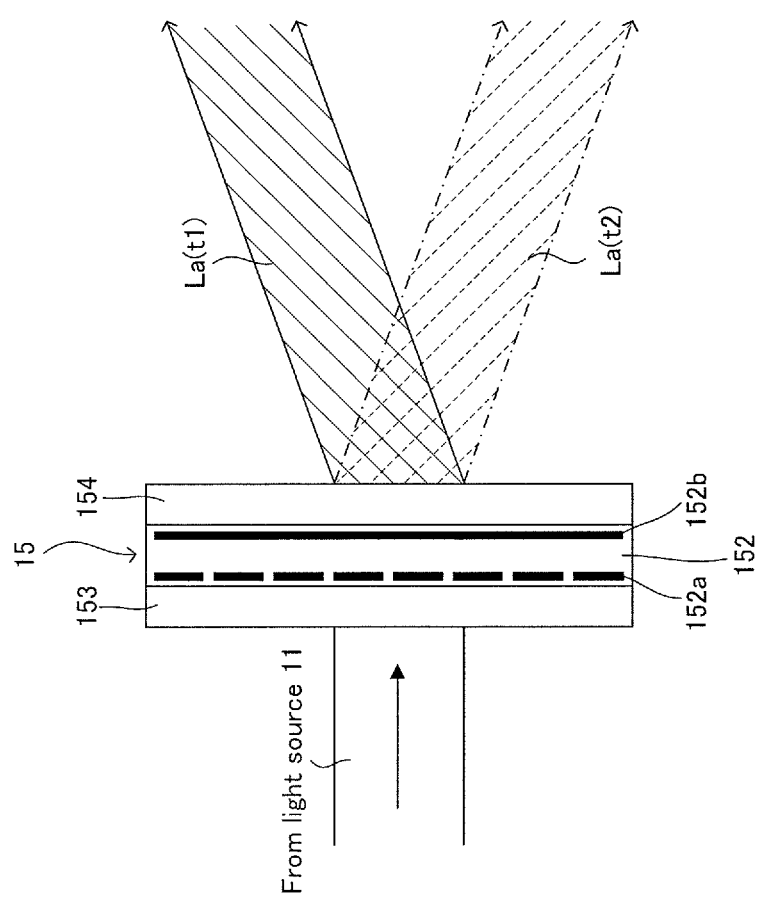

The light scanning section 15 of FIG. 7A is an embodiment using the phase modulation element. In this embodiment, a liquid crystal that modulates only a phase is used. As illustrated in FIG. 7A which is a configuration view of the light scanning section 15 using the phase modulation element, the optical scanning section 15 includes a liquid crystal layer 152 encapsulated between transparent base materials 153 and 154. The liquid crystal layer 152 includes pixel electrodes 152a provided sectionally and a common electrode 152b. By sequentially changing a refractive index section by section, the phase of transmitted light can be changed.

FIG. 7B is a view illustrating a basic form of a phase change and representing a phase distribution in correspondence with the configuration of FIG. 7A. By changing bias voltage to be applied to the pixel electrode 152a, a phase distribution as indicated by time t1 and time t2 can be formed. In such a phase distribution, as illustrated in FIG. 7A, the scanning light La, which is in a state of the scanning light La (t1) at the time t1, can be deflected into a state of the scanning light La (t2) at time t2. Actually, changing the phase state between the time t1 and time t2 in multiple stages or in a continuous manner allows a direction of the scanning light (La) to be changed in multiple stages or in a continuous manner.

FIGS. 8A to 8E are views illustrating another embodiment of the phase change. In this embodiment, the phase distribution is change into a Kinoform pattern, that is, a pattern in which the phase is repeatedly changed between $0\pi$ to $2\pi$ is changed with time to sequentially change a deflection condition to thereby change a deflection direction as in the case of FIG. 7B. As is the case with FIG. 7B, FIGS. 8A to 8E each represent a phase distribution in correspondence with the configuration of FIG. 7A. FIG. 8A represents a phase state at the time t1, and FIG. 8E represents a phase state at the time t2. By changing with time a phase shape from FIG. 8A to FIG. 8E and vice versa, the coherent light emitted from the light source 11 is deflected. The phase distribution may be set to a Fresnel lens type in which the phase range is a set to a range other than from $0\pi$ to $2\pi$.

Unlike the above-described variable diffraction element is used for the optical scanning section 15, zero-order light is not generated when the phase modulation element is used for the optical scanning section 15, light utilization efficiency can be enhanced. Moreover, as illustrated, the coherent light can be made to enter the incident surface of the optical scanning section 15 at right angles.

According to the present embodiment, there can be provided an illumination device that can make speckle noise less noticeable and a projection type image display device that can present an image in which the speckles noise is less noticeable by illuminating the optical modulation element 31 using the illumination device. Particularly, in the present embodiment, the diverging light diverged by the lens array 22 is used to illuminate, through the second optical path conversion system 23, the optical modulation element, whereby light utilization efficiency is enhanced.

The present invention is not limited to the above embodiments, and an embodiment obtained by appropriately combining technical features disclosed in each of the above embodiments is included in the technical scope of the present invention.

EXPLANATION OF REFERENCE SYMBOLS

10: Projection type image display device
11: Light source
15: Optical scanning section
151: Liquid crystal
152: Liquid crystal layer
152a: Pixel electrode
152b: Common electrode
153, 154: Transparent base material
21: First optical path conversion system
22: Lens array
23: Second optical path conversion system
231: Element lens
232: Optical element (transparent body)
233: λ/4 wavelength plate

The invention claimed is:

1. A projection type image display device comprising:
a light source that emits coherent light;
an optical scanning section that scans the coherent light emitted from the light source and changes with time an angle between a direction of a coherent light incident to the optical scanning section and a direction of a coherent light output from the optical scanning section;
a lens array including a plurality of element lenses and configured to diverge the light scanned by the optical scanning section;
an optical modulation element having an image formation area in which an image is formed;
a first optical path conversion system disposed between the optical scanning section and the lens array;
a second optical path conversion system configured to control a diverging angle of the diverging light to be emitted from respective points of the lens array and to allow the diverging light whose diverging angle has been controlled to illuminate an area to be illuminated sequentially in an overlapping manner; and
a projection optical system that projects the image of the optical modulation element on a screen,
wherein the element lenses constituting the lens array are in multiple rows in an optical axis direction thereof.

2. The projection type image display device according to claim 1, wherein
the second optical path conversion system illuminates the entire area to be illuminated regardless of a position at which the optical scanning section scans the coherent light.

3. The projection type image display device according to claim 1, wherein
the second optical path conversion system includes an optical element having a light collection function.

4. The projection type image display device according to claim 1, wherein
the element lenses constituting the lens array are each a gradient index lens.

5. The projection type image display device according to claim 1, wherein
a beam width of the coherent light that enters the lens array is smaller than an interval between adjacent element lenses.

6. The projection type image display device according to claim 1, wherein
a polarization control element is provided at an incident side or an emitting side of the lens array so as to prevent interference between beams passing through the adjacent element lenses.

7. The projection type image display device according to claim 1, wherein
an optical element that provides a difference in optical path length so as to prevent interference between beams passing through the adjacent element lenses is provided at the incident side or emitting side of the lens array.

8. The projection type image display device according to claim 1, wherein
the optical scanning section includes a galvano mirror.

9. The illumination device according to claim 1, wherein the optical scanning section includes a polygon mirror.

10. The projection type image display device according to claim 1, wherein
the optical scanning section includes a variable diffraction element.

11. The projection type image display device according to claim 1, wherein
the optical scanning section includes a phase modulation element.

12. The projection type image display device according to claim 1, wherein
focal planes of the element lenses of the lens array and a pupil surface of the projection optical system are kept in substantially a conjugate relationship.

* * * * *